United States Patent [19]

Buck et al.

[11] Patent Number: 4,849,874
[45] Date of Patent: Jul. 18, 1989

[54] SINGLE MAG AMP CONTROL SYSTEM FOR REGULATING BIPOLAR VOLTAGE OUTPUT OF A POWER CONVERTER

[75] Inventors: Robert J. Buck, Dover; Ralph Walk, Madison; Pradhuman S. Zaveri, Bridgewater, all of N.J.

[73] Assignee: American Telephone and Telegraph Company, AT&T Bell Laboratories, Murray Hill, N.J.

[21] Appl. No.: 261,070

[22] Filed: Oct. 24, 1988

[51] Int. Cl.[4] .............................................. H02P 13/24
[52] U.S. Cl. ....................................... 363/91; 363/63; 363/93; 323/253
[58] Field of Search ...................... 363/63, 75, 82, 90, 363/91, 93; 323/249, 251, 253, 329, 332, 335, 337

[56] References Cited

U.S. PATENT DOCUMENTS

| | | | |
|---|---|---|---|
| 2,795,652 | 6/1957 | Malick et al. .................... | 323/337 |
| 3,013,199 | 12/1961 | Hollingsworth, Jr. et al. ...... | 363/82 |
| 3,045,174 | 7/1962 | Lafuze ............................... | 363/91 |
| 3,229,186 | 1/1966 | Lafuze ............................... | 363/93 |
| 3,916,286 | 10/1975 | Waehner ............................ | 363/63 |
| 4,356,438 | 10/1982 | Iwasaki ............................. | 363/91 |
| 4,419,723 | 12/1983 | Wilson, Jr. ........................ | 363/82 |

*Primary Examiner*—Peter S. Wong
*Attorney, Agent, or Firm*—A. G. Steinmetz

[57] ABSTRACT

A power converter embodying the principles of the invention, and having a positive and negative output utilizes a single magnetic amplifier controller to control two saturable inductor cores utilized to regulate the positive and negative outputs by modulating the positive and negative pulse output of the power converter transformer. The magnetic amplifier controller monitors and sums the two voltage outputs and derives an offset from average representative output signal. This offset from average representative output signal is compared with a reference signal to derive an error signal. A current responsive to the error signal is generated and utilized to periodically reset the two saturable inductor cores and regulate the positive and negative output voltages.

7 Claims, 1 Drawing Sheet

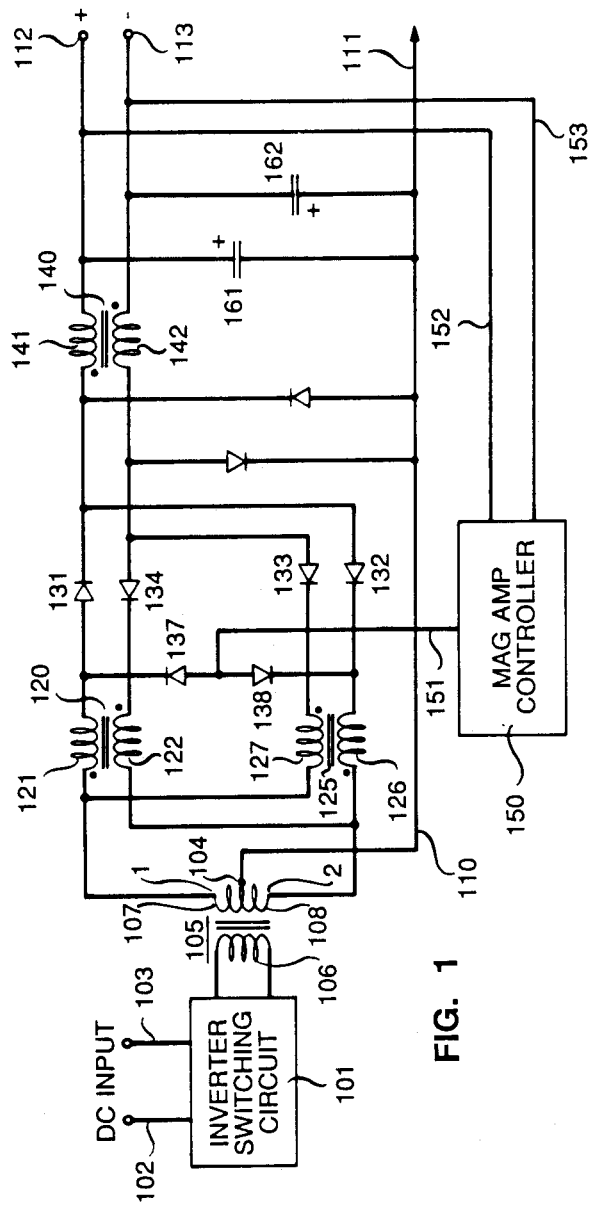
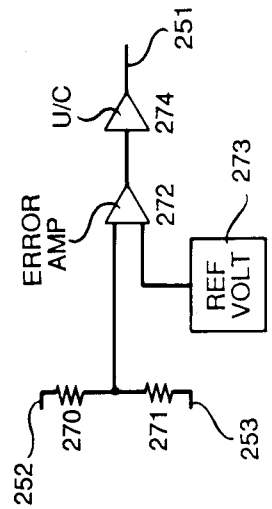
FIG. 1
FIG. 2

SINGLE MAG AMP CONTROL SYSTEM FOR REGULATING BIPOLAR VOLTAGE OUTPUT OF A POWER CONVERTER

FIELD OF THE INVENTION

This invention relates to power supplies having multiple outputs and in particular to power supplies using magnetic amplifiers to regulate the output.

BACKGROUND OF THE INVENTION

A multiple output power supply whose output is regulated by using magnetic amplifiers conventionally has two saturable inductor cores in each output and a separate magnetic amplifier controller for each output. While this provides precise regulation, the number of magnetic cores required and the need for a separate magnetic amplifier controller for each output is expensive and often provides regulation with more precision than is needed for a particular application.

SUMMARY OF THE INVENTION

A two output power converter, embodying the principles of the invention, utilize a single magnetic amplifier controller to control two saturable inductor cores utilized to regulate the positive and negative outpus of a converter by modulating the positive and negative pulse output of the power converter transformer. The magnetic amplifier controller monitors and sums the two voltage outputs and derives an offset from average representative output signal. This offset from average representative output signal is compared with a reference signal to derive an error signal. A current responsive to the error signal is generated and utilized to periodically reset the two saturable inductor cores and regulate the positive and negative output voltages.

BRIEF DESCRIPTION OF THE DRAWING

An understanding of the invention may be readily attained by reference to the drawing in which:

FIG. 1 is a schematic of a power converter embodying the principles of the invention; and FIG. 2 is is a schematic of a magnetic amplifier controller suitable for application to the power converter of FIG. 1.

DETAILED DESCRIPTION

A power converter embodying the principles of the invention is shown in FIG. 1, It includes an inverter switching circuit 101 which switches a DC voltage supplied by a DC energy source applied to input terminals 102 and 103. This inverter switching circuit 101 is not shown in detail since inverter switching circuits are well known in the art. It operates by periodically switching the applied DC voltage to produce an AC pulse signal which is applied to the primary winding 106 of power transformer 105. A secondary winding of the power transformer is center tapped at node 104 to produce two secondary windings 107 and 108 connected in series with each other. The center tap (node 104) is connected via lead 110 to a return terminal 111 which is common to two output terminals 112 and 113 which supply regulated DC voltage outputs of opposite polarity. A positive DC voltage output is supplied at terminal 112 and a negative DC voltage output is supplied to terminal 113.

A regulated positive DC voltage output at output terminal 112 is derived from secondary winding 107 when its pin 1 is positive with respect to the node 104. This voltage is coupled to the positive output terminal 112 through the magnetic amplifier winding 121 of magnetic amplifier core 120, rectifying diode 131 and winding 141 of filter inductor coil 140.

A regulated positive DC output voltage is also derived from secondary winding 108 when its pin 2 is positive with respect to the node 104 and is coupled to the output terminal 112 through winding 126 of magnetic amplifier core 125, rectifying diode 132 and winding 141 of filter coil 140.

Similarly a regulated negative DC voltage output is derived at output terminal 113 from secondary winding 108 when its pin 2 is positive with respect to the node 104. This voltage is coupled to the negative output terminal 113 through the magnetic amplifier winding 126 of magnetic amplifier core 125, rectifying diode 132 and winding 142 of filter inductor coil 140.

A regulated negative DC output voltage is also derived from secondary winding 107 when its pin 1 is negative with respect to the node 104 and is coupled to the output terminal 113 through winding 127 of magnetic amplifier core 126, rectifying diode 133 and winding 142 of filter coil 140.

Regulation of the DC output voltage at terminals 112 and 113 is controlled by a single magnetic amplifier controller 150. The magnetic amplifier controller 150 monitors the positive and negative output voltages at output terminals 112 and 113 via leads 152 and 153, respectively. It sums the two sensed voltage outputs and derives an offset voltage representative of an average output voltage This representative offset voltage of the average output voltage is compared with a reference voltage and an error voltage is generated. A current responsive to the error voltage is generated and applied on lead 151 wherein it is transmitted via diodes 156 and 157, which are switched by the voltage polarities, to transmit the reset current and periodically reset the two saturable inductor cores 120 and 125. While a representative voltage of the average output voltage is derived in this particular example with regulated output voltages of opposite polarity a conventional average voltage could be used if the two output voltages were of the same polarity.

An understanding of the invention may be readily attained by describing the operation of the circuit. The inverter switching circuit 101 applies a train of pulses of alternating polarity to the primary winding 106. Assume that a pulse in the secondary winding 17 is positive at pin 1 of that winding with respect to the center tap 104. Initially the transmission of this pulse is to the output 112, via inductor winding 121, is blocked by the inductance of the saturable inductor core 120. The time delay of the leading edge of the pulse caused by this block is determined by the level at which the core was reset following transmission of the previous pulse transmitted. At the end of this time delay the positive pulse is transmitted and goes via rectifying diodes 131 and 132 and the output filter comprising capacitor 161 and inductor winding 141 to the positive output terminal 112.

A negative output is supplied at output terminal 113 from the negative pin 2 of winding 108 and after the time delay determined by the reset level of saturable inductor core 120 is transmitted by winding 122 and capacitor 134 to the output filter comprising capacitor 162 and inductor winding 142 and from there to output terminal 113.

A similar process occurs when pin 2 of winding 108 becomes positive. Winding 126 of the saturable inductor core 125 delays the pulse as determined by the reset level to which it was set following transmission of the previous pulse. The rectifying diodes 132 and 133 rectify the positive and negative pulses respectively. Capacitor 162 and filter winding 141 filters the positive pulse and capacitor 162 and filter winding 142 filters the negative pulse. Hence a positive DC output voltage appears at output terminal 112 and a complimentary negative DC output voltage appears at output terminal 113.

The DC voltage outputs at terminals 112 and 113 are sensed and coupled via leads 152 and 153 to the magnetic amplifier controller 150. The magnetic amplifier controller 150 sums the magnitude of both the sensed output voltages to obtain offset representation voltage which is representative of the average magnitude of the two output voltages. This representative voltage is compared with a fixed reference voltage level by an error amplifier to obtain an error voltage. This error voltage of the error amplifier is transformed to a reset current for the two magnetic amplifier cores 120 and 125.

This reset current is applied to the magnetic amplifier core 120 through diode 137 when the pulse train a pin 1 of winding 107 is negative with respect to the center tap node 104. Similarly a reset current is applied to the magnetic amplifier core 125 through diode 138 when the pulse train is negative at pin 2 of winding 108 with respect to the center tap node 104. This reset current periodically resets the magnetic amplifier cores 120 and 125 by the exact amount necessary to maintain the average output voltage magnitude at a desired regulated value when the load at the outputs 112 and 113 varies or is changed.

Two free wheeling diodes 163 and 166 are included to maintain continuity of current in the filter windings 141 and 142 for both positive and negative currents during dead time pulses and diode blocking of the pulse train.

An illustrative controller is disclosed in FIG. 2. The two output voltages are coupled, via leads 252 and 253, to an offset voltage divider comprising the resistors 270 and 271 which are selected to be different in value. This voltage divider sums the two opposite polarity output voltages and derives a voltage representative of an average voltage value at the two output terminals. This representative voltage is applied to an error amplifier 272 which compares it to a reference voltage 273 and generates an error voltage which it applies to a transconductance amplifier 274. The transconductance amplifier 274 converts the error voltage to reset current which appears on its output lead 252 connected to the cores of the saturable inductors.

We claim:

1. A power supply with at least a first and second output, comprising:
   a first saturable inductor in series with the first output,
   a second saturable inductor in series with the second output,
   means for sensing an output voltage at both the first and second outputs,
   a magnetic amplifier controller adapted to sum the output voltages sensed by the means for sensing and derive a control voltage representative of an average output voltage and compare it to a reference voltage to obtain a reset current,
   means for applying the reset current to reset the first and second saturable inductors.

2. A power supply as claimed in claim 1 further including a power transformer having a primary and secondary winding,
   an inverter switching circuit connected to the primary winding,
   the first saturable inductor having a first and second winding,
   the second saturable inductor having a first and second winding,
   the secondary winding being centertapped and the first winding of the first saturable inductor connected to a first terminal end of the secondary winding and the first winding of the second saturable inductor being connected to a second terminal end of the secondary winding,
   the second winding of the first saturable inductor being connected to the second terminal end of the secondary winding and the second winding of the second saturable inductor being connected to the first terminal end of the secondary winding, and
   the means for applying the reset current being connected to the first winding of the first and second saturable inductors.

3. A power supply as claimed in claim 2 and further including
   first rectifying means for coupling positive voltages from the first winding of each of the first and second saturable inductors to the first output, and
   second rectifying means for coupling negative voltages from the second winding of each of the first and second saturable inductors to the second output.

4. A power supply as claimed in claim 3 and further including diode means oriented to periodically enable current flow in the means for applying the reset current.

5. A power supply as claimed in claim 4 and further including a filter inductor having a first and second winding connected in series with the first and second output respectively.

6. A power supply as claimed in claim 5 and further including means for assuring current continuity in the first and second windings of the filter inductor.

7. A power supply as claimed in claim 6 wherein the magnetic amplifier controller includes a voltage divider connected to the first and second outputs and having unequal first and second impedances in order to generate a voltage representative of an average of the two output voltages.

* * * * *